United States Patent [19]

Ritz

[11] 3,945,120

[45] Mar. 23, 1976

[54] VIBRATION DAMPENING AND HEAT SINK MECHANISM FOR A RECIPROCATING POWER SAW

[75] Inventor: Alan J. Ritz, Brookfield, Wis.

[73] Assignee: Milwaukee Electric Tool Corporation, Brookfield, Wis.

[22] Filed: Apr. 25, 1974

[21] Appl. No.: 571,545

[52] U.S. Cl. .................................. 30/393; 74/50
[51] Int. Cl.² .................................... B27B 11/02
[58] Field of Search .......... 30/392, 393, 394; 74/50, 74/60

[56] References Cited
UNITED STATES PATENTS

| | | | |
|---|---|---|---|
| 2,737,984 | 3/1956 | Bruck | 30/394 X |
| 2,917,088 | 12/1959 | Papworth | 30/393 X |
| 3,236,111 | 2/1966 | Naslund | 74/50 |
| 3,269,197 | 8/1966 | Enders | 74/50 |
| 3,457,796 | 7/1969 | Leach | 74/50 |
| 3,461,732 | 8/1969 | Gregory | 74/60 |

FOREIGN PATENTS OR APPLICATIONS

| | | | |
|---|---|---|---|
| 693,682 | 9/1964 | Canada | 30/392 |

*Primary Examiner*—Al Lawrence Smith
*Assistant Examiner*—J. C. Peters

[57] ABSTRACT

Vibration dampening and heat sink mechanism for a reciprocating hand-held saw has a carrier guide with limited axial and radial movement positively controlled by an eccentric. The carrier guide serves both as a counterweight and a heat sink. A drive shaft for an eccentric to provide such limited axial and radial movement also drives a wobble mechanism for reciprocating a saw blade carrier slidably mounted in the carrier guide. The center of gravity of the carrier guide travels in an elliptical path. The relative movement of the carrier guide with respect to the saw blade carrier and their relative weights are such that a substantial or near perfect balance may be obtained when aggressive orbital action of the saw blade and saw blade carrier is used as in the case of cutting wood. The location and mass of the carrier guide effects a heat sink for the heat generated by friction due to relative reciprocating motion of the slidably mounted saw blade carrier.

LAG ANGLE is defined as the angular difference if any, between the position of the eccentric shaft and the wobble shaft which results in the delay of the opposing axial movement of the carrier guide with respect to the saw blade carrier. The following examples will demonstrate this: when the Lag Angle is 0°, the axial movement of the carrier guide is opposite (180° out of phase) that of the saw blade carrier. The relative weight of the carrier guide and the saw blade carrier in conjunction with the relative motion described produce near perfect axial balance. When the Lag Angle is 30°, the opposing axial movement of the carrier guide lags by 30° (210° out of phase) that of the saw blade carrier. This results in a small sacrifice of the axial counterbalancing effect of the carrier guide.

5 Claims, 3 Drawing Figures

U.S. Patent  March 23, 1976  3,945,120
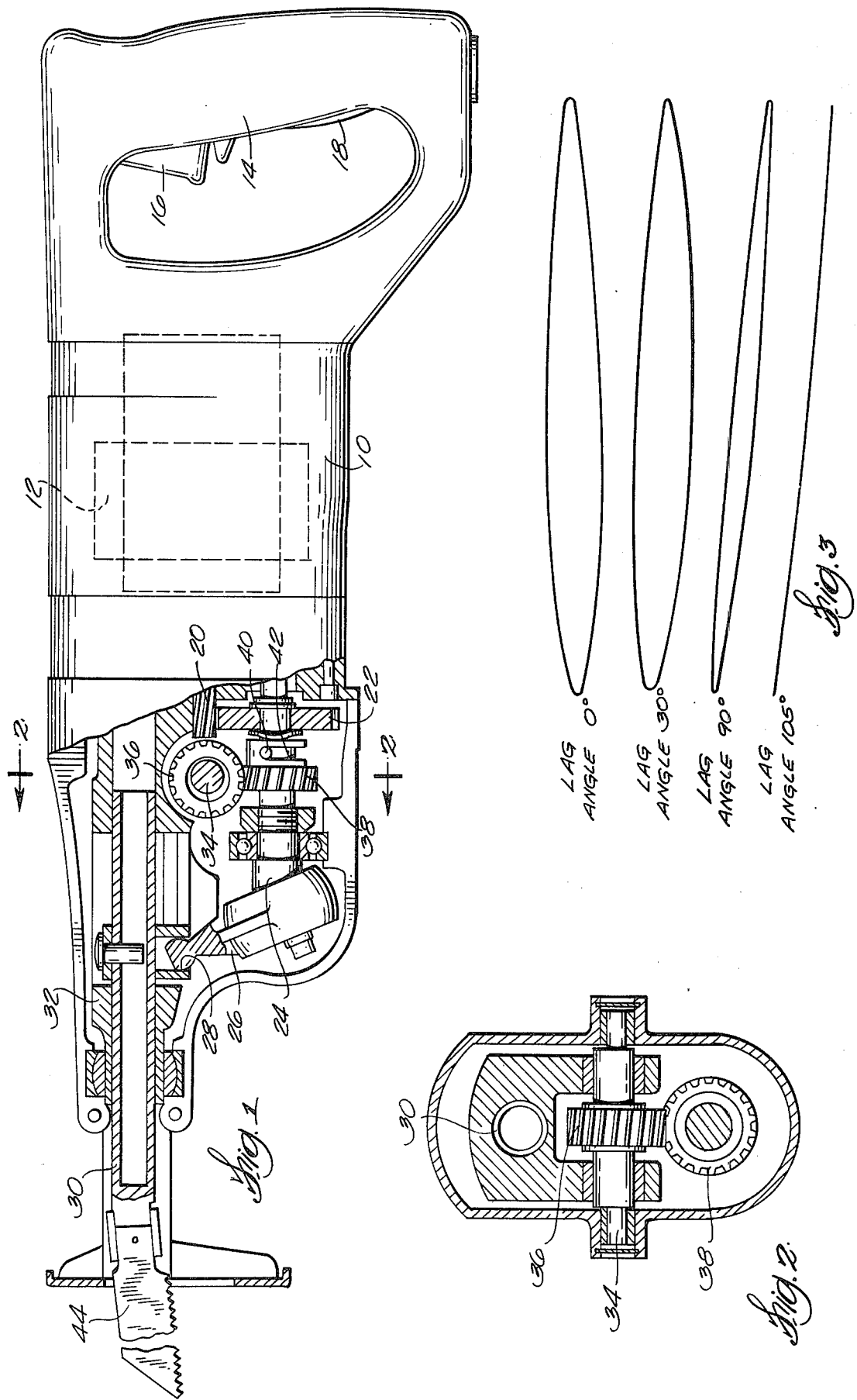

3,945,120

VIBRATION DAMPENING AND HEAT SINK MECHANISM FOR A RECIPROCATING POWER SAW

BACKGROUND OF THE INVENTION

1. Field of the Invention

This invention relates to improvements in hand-held, electric motor driven so called "all purpose" reciprocating saws, such improvements being: (1) the dampening mechanism to dampen the vibration due to the aggressive orbital cutting action of the saw blade; and (2) the heat sink action of such dampening mechanism.

2. Description of the Prior Art

Hand-held electric motor driven "all purpose" reciprocating saws in which the cutting blade is reciprocated in a path substantially parallel to the axis of rotation of the electric motor and in which the blade may be reciprocated in a pure reciprocating or substantially straight axial path or in an aggressive orbital path are disclosed for example in U.S. Pat. No. 3,461,732 and in the copending application of Alan J. Ritz entitled "Control for the Orbital Action of a Reciprocating Power Saw".

A patentability search on the feature of using a selected lag angle between the eccentrically controlled carrier guide and wobble drive mechanism for reciprocating the saw blade carrier in the carrier guide, and proportioning the relative weights and distances of travel of such carrier guide and such saw blade carrier to effect a near perfect balance and a dampening of vibration transmitted to the user uncovered only the following U.S. Pat. Nos.:

| | |
|---|---|
| 1,648,008 | 3,205,722 |
| 2,501,631 | 3,404,574 |
| 2,917,088 | 3,461,732 |
| 2,931,402 | 3,729,823 |
| 3,205,721 | |

None of these patents disclosed the feature of cooperating the relative reciprocal movements and relative weights of the carrier guide and blade carrier (including the saw blade) to effect either the dampening of vibration and the use of the carrier guide to also provide a heat sink.

BRIEF DESCRIPTION OF THE DRAWINGS

In the Drawings

FIG. 1 is an axially extending cross-sectional view of a reciprocating hand-held saw operated by an electric motor, with the saw blade shown in its outer extreme position, the eccentric shaft being in approximate midpoint position of upward travel with the carrier guide retracted, and embodying the vibration dampening and heat sink constituting the present invention.

FIG. 2 is a sectional view taken from the line 2—2 of FIG. 1 with the eccentric shaft rotated from the below midpoint upward position shown in FIG. 1 to the fully up position, the carrier guide being projected to about its midpoint of inward travel; and FIG. 3 is a diagramatic view of some of the paths taken by the saw blade when the saw blade is moving (1) in its aggressive orbital cutting path and (2) in its substantially straight reciprocating cutting action, that path of the carrier guide indicated as LAG ANGLE 30° being desirable for wood cutting and that path indicated as LAG ANGLE 105° being desirable in metal cutting. The paths as shown have longitudinal axes which are at controlled angles to horizontal. This is referred to as angle of inclination.

DESCRIPTION OF THE PREFERRED EMBODIMENT

Referring to the drawings by reference numerals, there is illustrated for the purpose of describing this invention a hand-held electric motor driven "all purpose" reciprocating saw. The saw in its major elements is like that described in U.S. Pat. No. 3,461,732, and in copending application of Alan J. Ritz entitled "Control for the Orbital Action of a Reciprocating Power Saw". It consists of a multipart composite case 10 which encloses and provides the mounting for a reversible electric motor 12. The case 10 has a customary handle 14 in which is mounted a switch trigger 16 and a reversing trigger 18. A motor shaft 20 has its end provided with a helical gear which mates with a driven helical gear 22 keyed to a wobble shaft 24 mounted in bearings in the transmission housing part of the case 10. As is well known in this art, a wobble plate 26 is mounted on the outer end of wobble shaft 24 and engages with socket 28 projecting radially from a saw blade carrier 30. The saw blade carrier 30 is hollow and at its center of gravity weighs approxmately 3 ounces and is slidably mounted within a central bore in a carrier guide 32. The blade carrier has about a one inch stroke. The carrier guide 32 at its center of gravity weighs approximately 24 ounces and has a horizontal travel of about ⅛ inch. When the LAG ANGLE is 0° (see FIG. 3), the vibration dampening is in perfect axial balance. When the LAG ANGLE is at 30° (the best for cutting wood), a near perfect axial balance of vibration is obtained.

The carrier guide 32 is mounted in a self-aligning ball bushing or other mounting which permits such carrier guide to have both a limited axial movement and a limited radial swinging movement. It is an essential feature of this invention, that both these movements and their relative rates of travel are controlled by the wobble shaft 24 and an eccentric shaft 34 driven by the wobble shaft. This shaft 34 is rotatively mounted in the transmission housing part of the casing 10. The eccentric shaft 34 is provided with a driven crossed-helical gear 36 which is in mesh with a drive crossed-helical gear 38 mounted on the wobble shaft 24 to have limited relative angular rotation of approximately 285° with respect thereto. This limited angular motion is accomplished by a pin 40 projecting from the wobble shaft 24 into an angularly extending slot 42 formed in the hub of gear 38. When the wobble shaft 24 is rotated in a counterclockwise direction as viewed from the left in FIG. 1, the pin 40 will be moved to the counterclockwise end of the slot 42 as shown in FIG. 1 with a LAG ANGLE of 30°. In this position of operation, the wobble mechanism will cause the saw blade 44 carried by the saw blade carrier 30 to start retraction from its extended position shown in FIG. 1 and begin its cutting stroke. The eccentric shaft 34 will be driven in a counterclockwise direction of rotation as viewed from the center of FIG. 1. The eccentric shaft 34 will swing the inner end of the carrier guide 32 radially upwardly and move such carrier guide axially inward for the first 30° of eccentric shaft rotation, at the end of said interval, the eccentric shaft will commence movement of such carrier guide axially outward. This will cause the saw blade 44 to move downwardly and inwardly along the aggressive lower portion of the orbital path shown as Lag Angle 30° in FIG. 3. When the wobble plate 26 starts to move the blade 44 outwardly back to the extended position shown in FIG. 1, the eccentric shaft 34 will forcibly swing the inner end of the carrier guide 32 radially downwardly and move such carrier guide axially outward for the first 30° of eccentric shaft rotation, at the end of said interval, the eccentric shaft will commence movement of such carrier guide axially inward. This will cause the saw blade to move upwardly and outwardly along the upper portion of the aggressive orbital path shown as LAG ANGLE 30° in FIG. 3. Thus permitting the blade to be relieved from the work during its return stroke.

The opposite axial movements of the carrier guide 32 and the blade carrier 30 will at the relative weights and relative distances of travel heretofore set forth let the carrier guide 32 perform the function of counterbalancing the motion of the blade carrier 30 and blade 44 and provide a vibration dampening action. Thus the carrier guide performs both carrier function of aggressive orbital cutting and vibration dampening.

A further essential feature of the invention is the "change of phase" between the wobble shaft 24 with its wobble plate 26 and the eccentric shaft 34 to shift the action of the saw blade from the aggressive orbital path LAG ANGLE 30° to the substantially straight lineal paths of LAG ANGLE 105°. This is accomplished by stopping the rotation of the electric motor 12 and reversing the direction of rotation of the motor or by other transmission means to cause the wobble shaft 24 to change its rotation to clockwise as viewed from the left in FIG. 1. This will cause the pin 40 to move to the other end of the slot 42, thus creating a substantial change in the LAG ANGLE.

After the phase shift is accomplished by reversing the direction of rotation of the wobble shaft 24, the saw blade will follow the path indicated as LAG ANGLE 105° in FIG. 3. Consider the action as commencing with the wobble plate shown in the position of FIG. 1 and the saw blade extended, the eccentric shaft 34 will remain in the approximate midpoint position with no rotational travel until the pin 40 is moved angularly about 285°. At this point, the wobble plate 26 will have completed its retraction of the saw blade (cutting stroke) and slightly more than half of such return stroke with such blade moving in a substantially straight lineal path (pure reciprocating). As this point is reached, the eccentric shaft will start to be rotated to move the inner end of the carrier guide 32 radially downwardly. Thereafter, the saw blade follows the substantially straight inclined path shown as LAG ANGLE 105° of FIG. 3. Such path is produced by the eccentric 34 moving the inner end of the carrier guide 32 radially downwardly during the entire outward stroke of the wobble plate 26 and by the eccentric 34 moving such inner end of the carrier guide 32 radially upward during the entire inward stroke of the wobble plate 26. This combined motion of eccentric 34 and wobble plate 26 produces the substantially straight inclined path shown as LAG ANGLE 105° of FIG. 3. At the large lag angles such as LAG ANGLE 105° of FIG. 3, the beneficial axial counterbalancing effect of the carrier guide 32 is greatly diminished.

When it is desired to return to wood cutting aggressive orbital action, the motor is stopped and restarted in normal rotation or the transmission means is manipulated to cause the wobble shaft 24 to rotate in the counterclockwise direction heretofore described. For the first 285° of such rotation, there will be substantially straight line, pure reciprocating movement of the saw blade. Thereafter, the blade will follow the orbital path of such LAG ANGLE 30°.

While the lag or phase angles are only shown at identified extremes, various other lag or phase angles between such extremes can be accomplished by using specially constructed clutch means and a multiple variety of cutting paths can be readily obtained. For example, a cutting stroke could be made to follow an upper path and lower path of either a wide or a narrow orbital path. The angle of the longitudinal axis (angle of inclination) can be changed from the slopes as shown.

The advantage of controlling the angle of inclination resides in the blade pressures developed by the weight of the saw without the pressures created by the operator.

While the up and down swinging movement of the carrier guide 32 will have some effect to increase and decrease the operator force applied to the saw blade and unbalance in such radial direction will exist at any LAG ANGLE. Such unbalance will not cause an undue vibrational transmission to the operator.

I claim:

1. A power saw comprising:
   a. a casing;
   b. a motor mounted in said casing having an output element;
   c. a carrier guide mounted in said casing for relative axial movement said guide having a mass to cause it to act as a counterweight;
   d. a saw blade carrier axially movable in said carrier guide; and
   e. drive means connecting said output element to said carrier guide and said blade carrier to provide both with cooperatively controlled axial movement.

2. A power saw as defined in claim 1 in which the mass of said carrier guide and its travel with respect to said saw blade carrier and the mass of said saw blade carrier results in a substantial balance.

3. A power saw as defined in claim 2 in which the mass of said carrier guide relative to the mass of said saw blade carrier is substantially eight to one.

4. A power saw as defined in claim 3 in which the travel of said saw blade carrier relative to the travel of said carrier guide is substantially eight to one.

5. A power saw as defined in claim 1 in which the mass and position of said carrier causes it to act both as a counterweight and a heat sink.

* * * * *